June 8, 1926.
R. HICGUET
1,587,645
CONTROL OF ELECTRIC MOTORS
Filed March 3, 1924  3 Sheets-Sheet 1
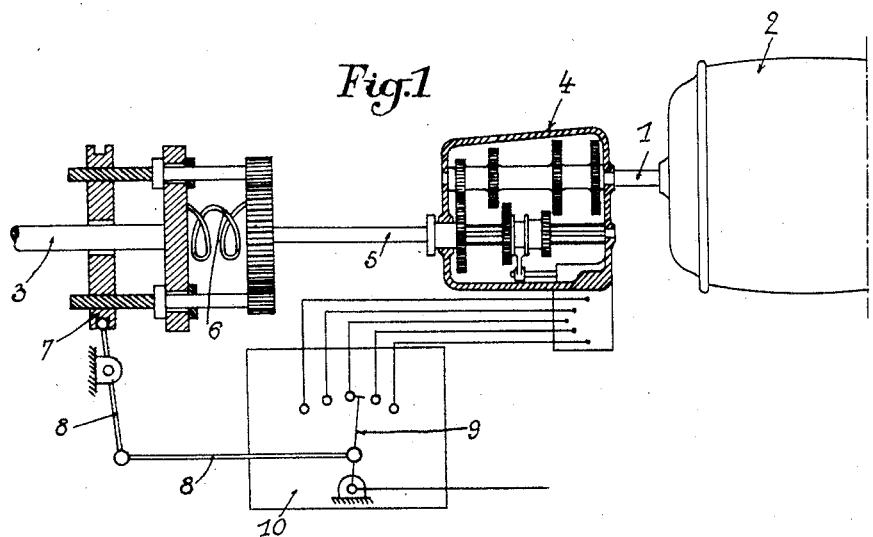
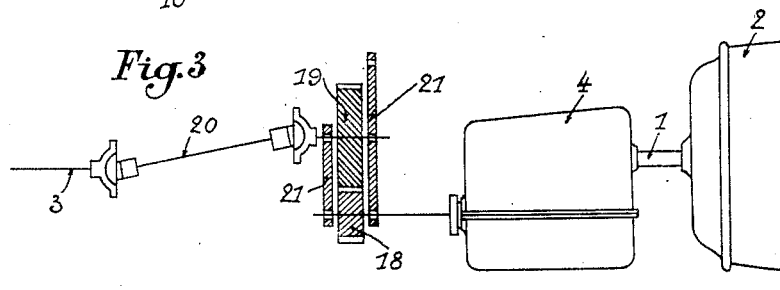
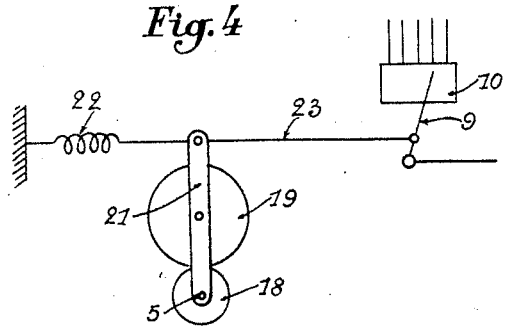
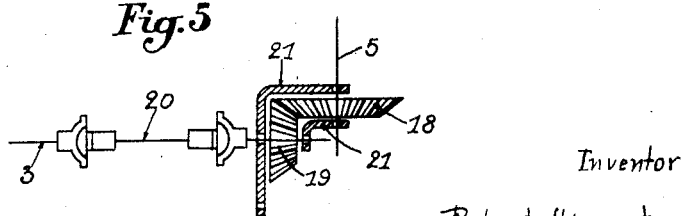
Inventor
Robert Hicguet
by
his Attorney June 8, 1926.
R. HICGUET
1,587,645
CONTROL OF ELECTRIC MOTORS
Filed March 3, 1924      3 Sheets-Sheet 2
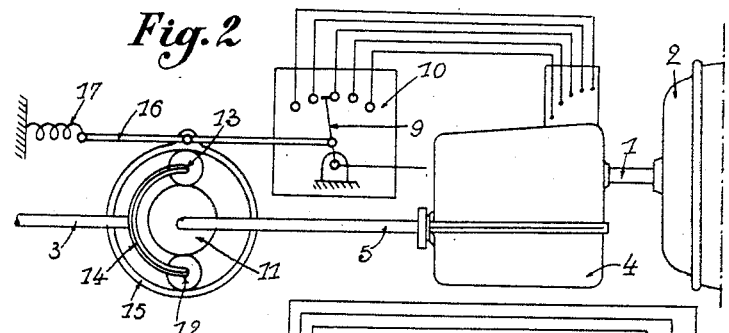
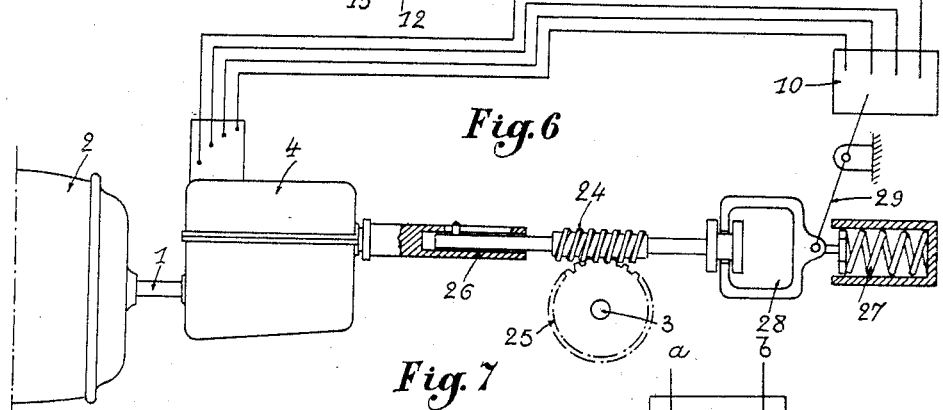
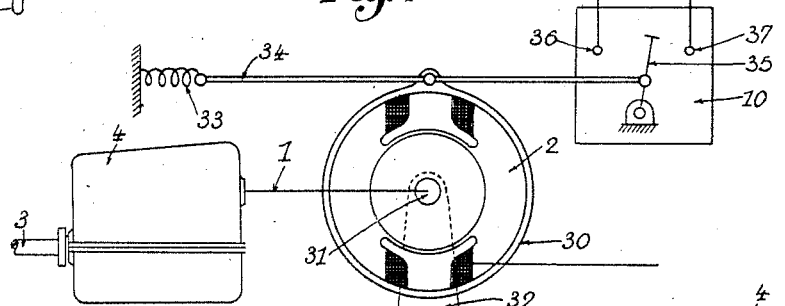
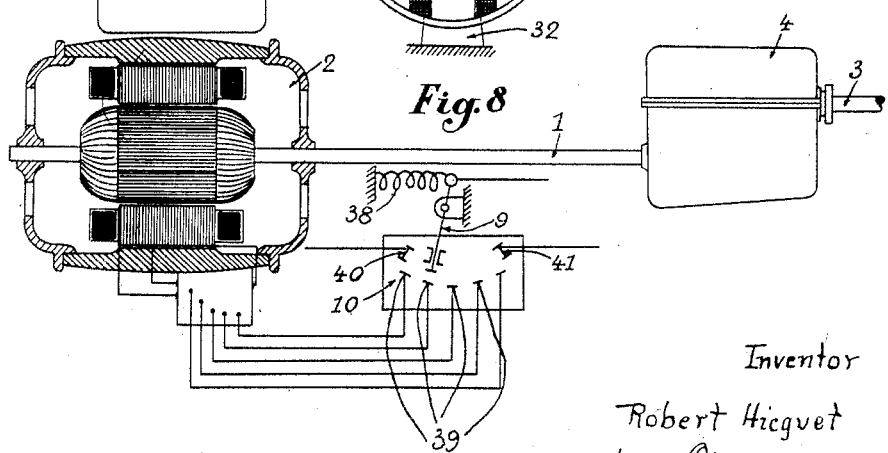
Inventor
Robert Hicguet
by *Ottomun*
his Attorney June 8, 1926.

R. HICGUET 1,587,645

CONTROL OF ELECTRIC MOTORS

Filed March 3, 1924　　3 Sheets-Sheet 3

Robert Hicguet
INVENTOR;
his Attorney.

Patented June 8, 1926.

1,587,645

UNITED STATES PATENT OFFICE.

ROBERT HICGUET, OF PARIS, FRANCE, ASSIGNOR TO LA TRACTION ELECTRIQUE RATIONNELLE, OF PARIS, FRANCE.

CONTROL OF ELECTRIC MOTORS.

Application filed March 3, 1924, Serial No. 696,483, and in France November 19, 1923.

The present invention has for its object a device adapted for the control of the electro-magnetic change speed devices used in co-operation with electric motors and in particular with electric traction motors.

One feature of the invention resides in that the device comprises a dynamometer which is subjected to the action or reaction of the resistance couple and is operatively connected to contact devices, relays, electromagnets and like known devices controlling the operation of the change speed device, that is to say throwing on one or another speed, the change of speed being thus effected according to the deformation of the elastic element of the dynamometer, the speed of the motor and the power torque being thus automatically varied in accordance with the resistance couple upon the driven shaft.

This automatic control may be combined with a hand controlled device adapted to reduce to a maximum the speed allowed by the dynamometer.

The dynamometer may also be used, as already known, for modifying the electric constants of the motors in case the latter are direct current motors so as to increase the variation of speed of the driven shaft and to render the change of speed progressive when the elements in engagement in the electro-magnetic change speed device, are changed under the influence of the dynamometer.

In the appended drawings and by way of example:

Figs. 1 to 8 show diagrammatically different embodiments of the device according to the invention.

Figs. 10 and 11 are diagrams of hand operated devices for reducing the speed allowed by the automatic regulation, the device shown in Fig. 10 being a mechanical device, while Fig. 11 illustrates an electrical device.

Figure 9:
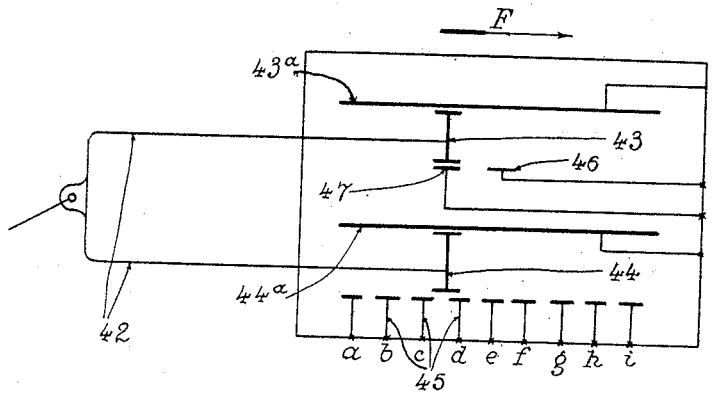
Fig. 9 shows diagrammatically a contact apparatus controlled by the dynamometer and adapted for use with a change speed device box with two operative positions.

In the device shown in Fig. 1, 1 is the shaft of the motor 2 which rotates the driven shaft 3 through the medium of the electromagnetic change speed device of a known type 4, of the shaft 5 and of the elastic coupling 6 of a known construction. The deformations of the elastic coupling 6 depend upon the resistance couple, and are transmitted to the piece 7 whose movements, which are proportional to said elastic deformations, are transmitted through the levers 8, to the control arm 9 of a contact apparatus 10. This apparatus 10 controls the electro-magnetic change speed device 4, in any known manner, and for each position of the arm 9 corresponds a given ratio of transmission between the driving shaft 1 and the driven shaft 3. It will be understood that the power couple will vary with the resistance couple since the variations of the latter determine the displacements of the piece 7 which, through the medium of the contact apparatus, controls the change speed device.

Fig. 2 shows a modification in which the reaction of the resistance couple takes place on one of the three elements of an epicycloidal gear set disposed between the electromagnetic change speed device 4 and the driven shaft 3. The shaft 5 of the box 4 carries a pinion 11 meshing with the planetary gears 12 and 13 connected to each other by a bridge piece 14 which is itself keyed to the shaft 3. The planetary gears engage on the other hand the outer toothed ring 15 to which is pivoted a rod 16 urged by a dynamometric spring 17 and acting upon the arm 9 of the contact apparatus 10 which controls the change speed device 4. According to the value of the resistance couple, and under the action of the spring 17, the ring 15 is displaced in either direction, and the rod 16 moves the arm 9 of the apparatus 10 which puts automatically in engagement the suitable pinion of the change speed device 4.

In the modifications shown in Figs. 3, 4 and 5 the dynamometer is acted upon by the reaction of the resistance effort on the bearings of a gear transmission device.

Fig. 3 is a diagrammatic section and Fig. 4 a side view of a device, wherein the transmission of motion is effected by means of gear wheels having parallel shafts. According to Figs. 3 and 4, to the shaft 5 of the change speed device 4 is keyed a pinion 18 driving a pinion 19 which is connected, by a Cardan joint 20 or by an elastic coupling, with the driven shaft 3. The bearings 21 of the pinion 19 are movable with respect to the shaft carrying the pinion and are connected with a dynamometer 22. The deformations of the dynamometer 22 are transmitted by suitable levers 23 to the arm 9 of a contact apparatus 10 serving to control the change speed device according to the deformations of the dynamometer, and hence according to the variations of the resistance couple.

Fig. 5 shows a modification of the device illustrated in Figs. 3 and 4, and in which the shafts of the pinions 18 and 19, instead of being parallel, are at right angle, the pinions being in this case bevel gear wheels. Obviously, the angle between the axes of the pinions may be as desired, these gears having then a corresponding shape. It is also obvious that the Cardan joint shown in Figs. 3 and 5 may be placed on either side of the gear set.

Fig. 6 shows diagrammatically a modification in which the resistance couple acts directly upon the worm of a worm transmission gear, this device being already known in itself. The action of the resistance couple imparts to the worm a longitudinal translation which is transmitted to the arm of the contact box controlling the electro-magnetic change speed device. In Figure 6, 4 is the change speed device which controls the driven shaft 3 through the medium of a worm gear, the worm 24 whereof engages the worm wheel 25 keyed to the shaft 3. The worm is operatively connected to the change speed device either by means of a slide shaft 26 or by means of a flexible or elastic coupling, in such manner that the lengthwise reaction of the couple shall be supported by a dynamometer 27 connected to the worm 24 by the piece 28. The deformations of the dynamometer result in an angular displacement of the arm 29, which cooperates with a contact apparatus 10 controlling the operation of the change speed device 4.

If required, the dynamometer may as well be placed before the change speed device, for instance as in Fig. 7. In said figure the stator 30 of the motor 2 is pivotally mounted on a shaft 31 which coincides with the axis of the motor; this shaft 31 is supported by independent bearings 32. This stator is connected with a dynamometer 33 which controls, by means of suitable levers 34 and an arm 35, a contact apparatus 10 with two operative positions $a$ and $b$. The contacts 36, 37 close, by means of the arm 35, distant control circuits operating the change speed device 4 which is actuated by the motor through a suitable mechanical transmission. For example if the arm 35 closes the circuit of the contact 37 corresponding to the maximum couple of the motor, this circuit will provide for the engagement of the pinions in the change speed device which correspond to the lower speed for the driven shaft. On the contrary, when the contact 36, corresponding to the minimum couple, is closed by the arm 35, this will cause the engagement in the change speed device of the pinions giving the high speed to the driven shaft.

Fig. 8 shows diagrammatically and by way of example a device designed for use with direct current motors and in which the dynamometer, placed before the change speed device, is subjected to the resistance couple through the medium of any of the above-described devices. In this arrangement, the deformations of the dynamometer serve to control the contact box cooperating with the change speed device according to the diagram of Fig. 7 conjointly with the known methods for acting upon the electric constants of the direct current motor or motors, so as to vary their speed in relation to the couple. In Fig. 8, a direct current motor 2 actuates the driven shaft 3 through the intermediary of a change-speed device 4. A dynamometer 38 which responds to the action or reaction of the resistance couple is made to control the arm 9 of a contact apparatus 10. The latter is provided with two sets of contacts: One set 40, 41 is used for the control of the change-speed device, while the contacts 39 of the other set are used for the control of the electric constants of the motor, by means of rheostats, relays or any like devices.

The operation of the whole device is as follows: If for example the minimum couple corresponds to the position of the arm 9 upon the contact 40, the connection of the contacts 39 are such that the speed of the motor will be a maximum when the arm 9 reaches the position 40, and that the speed will be a minimum when this arm reaches the position 41. When the contact 40 is reached by the arm 9 (minimum couple), this contact will cause the engagement in the change-speed device 4 of the elements giving the speed just above, to the driven shaft 3, and when the contact 41 is reached by the arm 9 (maximum couple) this contact will cause the engagement in the change-speed device of the elements giving the speed just below, to the driven shaft 3. In this manner, the speed of the driven shaft 3 will vary in a progressive manner by reason of the control effected upon the electric constants of the motor between the different positions of the gears in the change-speed device 4.

It is obvious that the contacts controlled by the dynamometer 38 in the above-mentioned device, can control several change-speed devices when several motors are used to drive the same driven shaft, or when one single motor is used to drive several driven shafts. The apparatus illustrated in Fig. 9 is a modification of the contact apparatus shown in Fig. 8, the dynamometer, not shown, but operating the rods 42, being placed between the change-speed device and the driven shaft. The rods 42 actuate the two movable contact pieces 43 and 44 which may take the various positions from a to i. The contact 43, which constantly rubs upon the conductor 43ª, will control the operation of the change-speed device when touching the contact pieces 46 and 47; the contact piece 44 which makes contact with the conductor 44ª controls, through the contact pieces 45, the electric constants of the motor so as to vary the speed of the latter. If the contacts 43 and 44 are impelled for example according to the arrow F, the first speed of the change-speed device (the slowest) will remain in engagement until the contact piece 43 touches the contact piece 46, that is to say, for the positions from a to e of the contact 44. In the motion in the contrary direction to the arrow F, the second speed will remain in engagement until the contact piece 43 touches the contact piece 47, that is to say, in the positions from i to d for the contact 44. The contact 44 will act upon the electric constants of the motor, so that when the contact 44 is at a the speed of the motor is a minimum, and when said contact is at i the speed is a maximum. This speed will be also a minimum at the moment of the change-over to the second speed, i. e., when the contacts are at e. Further, the speed of the motor when the contacts are at d, at the time of the return to the first speed, will be greater than when the contacts are at a, so that the speeds of the driven shaft will be very close together for the position d and the position e, and there will be no shocks during the change from the second speed to the first in the change speed device and inversely.

The automatic devices according to the present invention, will be advantageously used conjointly with a hand operated control device for reducing the speed of rotation of the motor permitted by the automatic regulation.

Figure 10:
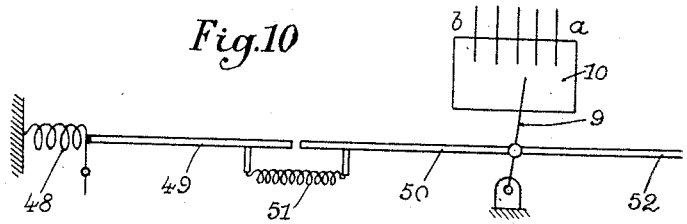

In Fig. 10, a dynamometer, 48, responsive to the action or reaction of the resistance effort, operates through the medium of the levers or rods 49 and 50, the arm 9 of a contact box 10 controlling the operation of an electro-magnetic change speed device. The rods 49 and 50 are connected together by a spring 51. The arrangement of the parts is such that when the arm 9 is at its end position a the speed decreases or has already reached a minimum and when this arm is at the end position b the speed increases or has already reached a maximum. But if the spring 51 is stretched, by pulling on the rod 52, the arm 9 is brought towards the position a, and the speed tends to be reduced. Any movement of the rod 52 in the opposite direction might be performed until the rods 49 and 50 come into contact. In this manner the variation of speed by the hand operated rod 52 can only take place between the minimum speed and the speed allowed by the automatic regulation. The spring 51 may be used as a connection between any two elements of the means operatively connecting the dynamometer to the movable arm of the contact box.

Figure 11:
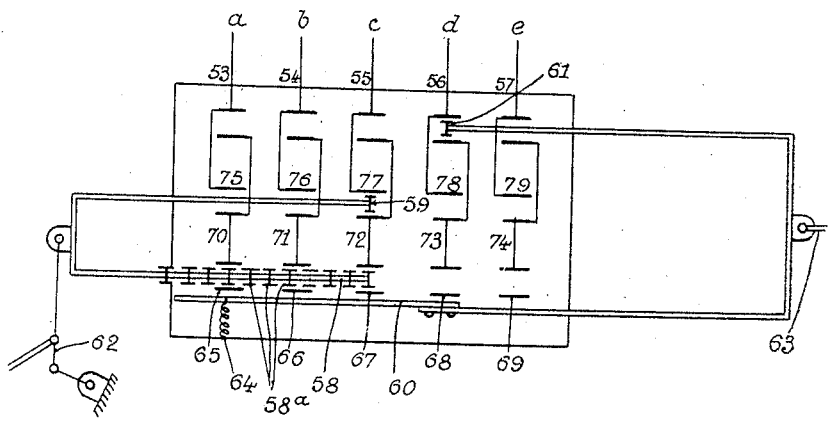

In Fig. 11, the contact box controls the operation of the electromagnetic change-speed device by the wires 53, 54, 55, 56, 57 whose number depends upon the number of speeds in the change-speed device. This control is effected by the combination of the contacts 58 and 59 with the contacts 60 and 61. The contacts 58 and 59 are automatically actuated through the medium of the levers 62, by the dynamometer which is responsive to the action of the resistance couple; the contacts 60 and 61 are actuated at will by a separate control 63. These contacts may take the positions, a, b, c, d, e. The position a corresponds to the slowest speed and e corresponds to the highest speed. The current entering through the terminal 64 is supplied to the contacts 53, 54, 55, 56, 57 through the connections established by the contacts 58, 59, 60 and 61.

The operation of the whole device is as follows: The contact 60 can, according to its position, supply the current to the contact pieces 65, 66, 67, 68, 69 upon which the contact piece 58 may rub. The contact 58 can, according to its position, send the current into the contact pieces 70, 71, 72, 73, 74, 75, 76, 77, 78, 79. The contact 58 is constituted of a set of small contacts 58ª insulated from each other, so as to provide for the passage of the current in the vertical direction of the figure and to break the same in the horizontal sense. The contacts 59 or 61 then lead the current from the preceding contacts to the contacts 53, 54, 55, 56 or 57.

Fig. 11 shows that the contacts 58 and 59 being in the position c and the contacts 60 and 61 in the position d, the current will enter the terminal 55 (position c) in spite of the fact that the contacts 60 and 61, actuated at will by the arm 63, are in the position d. If the contacts 60 and 61 are moved towards the position b, the current will reach the terminal 54 through the contact pieces 60, 66, 58, 71, 61, 54. The circuit ending at the terminal 55 is in fact broken between the contact 60 and the contact piece 67. It is readily observed that one can reduce the speed allowed by the automatic control, by returning the contacts 60 and 61 controlled at will, into the position b or a, but that one cannot increase this speed by bringing the contacts 60 and 61 into the positions d and e.

Obviously, many constructional modifications may be brought to the devices above described without departing from the scope of the invention. In particular, the described contact elements can be replaced by relays, electro-magnets or like devices allowing the control of the electro-magnetic change-speed device.

Having now described my invention, what I claim as new and desire to secure by Letters Patent is:

1. A power plant comprising electric motors, an electro-magnetic change speed device, a shaft driven by said motors through the intermediary of said change speed device, electric means for controlling said change speed device, a dynamometer subjected to the action of the resisting couple, and means for operatively connecting said dynamometer to said control means for the change speed device.

2. A power plant comprising direct current electric motors, an electro-magnetic change speed device, a shaft driven by said motors through the intermediary of said change speed device, electric means for controlling said change speed device, means for controlling the constants of said motors, a dynamometer subjected to the action of the resisting couple, and means for operatively and separately connecting said dynamometer to said control means for the change speed device and to said control means for the constants of the motors.

3. A power plant comprising direct current electric motors, an electro-magnetic change speed device, a shaft driven by said motors through the intermediary of said change speed device, electric means for controlling said change speed device, means for controlling the constants of said motors, two sets of fixed contact pieces respectively connected with said control means for the change speed device and for the constants of the motors, two movable contact pieces respectively cooperating with said sets of fixed contact pieces, a dynamometer subjected to the action of the resisting couple and means for operatively connecting said dynamometer to both movable contact pieces.

4. A power plant comprising direct current electric motors, an electro-magnetic change speed device, a shaft driven by said motors through the intermediary of said change speed device electric means for controlling said change speed device, means for controlling the constants of said motors, two sets of fixed contact pieces respectively connected with said control means for the change speed device and for the constants of the motors, two movable contact pieces respectively cooperating with said sets of fixed contact pieces, a dynamometer subjected to the action of the resisting couple and means for operatively connecting said dynamometer to both movable contact pieces, the connections between the means for controlling the constants of the motors and the respective set of fixed contact pieces being such that the speed of the motion is a minimum when passing to a higher speed of the driven shaft and is a maximum when passing to a lower speed of the driven shaft.

5. A power plant comprising electric motors, an electro-magnetic change speed device, a shaft driven by said motors through the intermediary of said change speed device, electric means for controlling said change speed device, a dynamometer subjected to the action of the resisting couple, and means including a yielding member for operatively connecting said dynamometer to said control means for the change speed device and whereby relative movements of said control means are afforded with respect to said dynamometer for causing a reduction of speed of the driven shaft.

6. A power plant comprising electric motors, an electro-magnetic change speed device, a shaft driven by said motors through the intermediary of said change speed device, electric means for controlling said change speed device, a dynamometer subjected to the action of the resisting couple, electric means embodying a set of successive contacts for operatively connecting said dynamometer to said control means for the change speed device, and a hand operated contact member adapted to short circuit the contacts established by the dynamometer and to substitute for the same contacts of the same set corresponding to lower speeds for the driven shaft.

7. A power plant comprising electric motors, an electro-magnetic change-speed device, a shaft driven by said motors through the intermediary of said change speed device, electric means for controlling said change speed device, a dynamometer subjected to the action of the resisting couple, electric means embodying three sets of fixed contacts for operatively connecting said dynamometer to said control means, said three sets comprising one feed set and two outlet sets, a series of movable contact pieces actuated by said dynamometer for closing at the same time the contacts of the feed set which correspond to the running speed and to the lower speeds, a further movable contact piece also actuated by the dynamometer and adapted to connect said contacts of the feed set to that of the first outlet set which corresponds to the running speed and a hand operated contact member adapted to close any desired contact of the second outlet set while opening at the same time all the contacts of the feed set corresponding to a speed higher than that corresponding to the position of said hand operated member.

In testimony whereof I have signed my name to this specification.

ROBERT HICGUET.